2,951,782
Patented Sept. 6, 1960

2,951,782
GLASS FIBER TREATMENT

George E. Eilerman, Rushville, Ind., assignor to Pittsburgh Plate Glass Company, a corporation of Pennsylvania No Drawing. Filed Jan. 3, 1956, Ser. No. 556,819

4 Claims. (Cl. 154—90)

The present invention relates to a glass fiber surface treatment and it has particular relationship to a finishing agent for glass fibers employed as a reinforcement for resins and plastics.

It is common practice to use glass fiber strands and glass fiber cloth for reinforcing various resins and plastics. Such strands are employed as groups of strands known as roving and as chopped strands about 1 to 3 inches in length, usually in mat form. The glass fibers are generally made in the form of continuous filament strands and then fabricated into one of the above forms, depending upon the particular reinforcing use.

A continuous filament glass fiber strand is composed of a multitude of fine glass filaments which are drawn, at a very high rate of speed, through small orifices in a bushing. During manufacture, the filaments are coated with a size which acts as a binder to give the strand integrity for workability, i.e., twisting, plying, weaving, etc. The size also serves as a lubricant to prevent destruction of the strand by abrasion of the individual filaments against each other.

When glass fibers are to be used for reinforcing plastics and resins, they are frequently coated with a finish material which will make the surface of the glass fibers hydrophobic and compatible with the particular resins with which they are to be employed. This material is usually combined with the size and applied to the fibers during their attenuation and formation. The material is also applied to woven glass fiber cloth which is to be used as a resin reinforcement. Usually, the cloth is heat cleaned or chemically treated to remove the binder and lubricant before the finish is added.

One group of materials which have found favorable use for treatment of glass fibers for resin reinforcement are known as "chrome" finishes. These materials comprise a complex compound of the Werner type in which a trivalent nuclear chromium atom is coordinated with an acid such as methacrylic acid. See U.S. Patents Nos. 2,552,910 and 2,611,718. Use of these compounds in combination with glass fibers for resin reinforcement results in reinforced resins having increased flexural strength.

One of the principal objections to the use of the so-called "chrome" finished glass fibers has been the green color which such treatment adds to the glass fiber-resin product. This green color is especially observed in glass fiber-resin extrusions where the ratio of glass to resin is high and the cross-section of the extruded piece is large. Accordingly, it is an object of the present invention to provide a treatment for glass fibers for resin reinforcement which provides increased dry and wet strengths to the glass fiber-resin products and enables the production of clear, reinforced resin products.

The use of various organosilicon compounds as surface treating agents for glass fibers is known. The use of alkenyl and alkyl silicon halides to render glass surfaces hydrophobic is shown in U.S. Patents Nos. 2,306,222 and 2,420,912. A number of organosilicon compounds are listed in U.S. Patents Nos. 2,390,370 and 2,392,805. These compounds are stated to be useful as lubricants and binders for glass fibers.

A few organosilicon compounds have shown desirable properties for improving the dry and wet flexural strengths of glass fiber-resin laminates. Allyl ethoxy and allyl chlorosilanes are disclosed for this purpose in U.S. Patent No. 2,563,288 and vinyl triethoxysilane is disclosed in U.S. Patents Nos. 2,688,006 and 2,688,007. Vinyl trichlorosilane has also been suggested for this purpose.

The use of allyl and vinyl chloro or ethoxy silanes is accompanied with many difficulties. They are difficult to prepare and use. In the case of the trichloro silanes, the silicon derivative is too reactive to use without a preliminary hydrolysis step. Products resulting from this hydrolysis remain in the finish and interfere with the refractive index at the glass interface. Some of the organosilicon compounds require excessively high temperatures to cause "fixation" on the glass fibers. This results in the requirement of special production procedures. Other silicon derivatives require controlled hydrolysis with consequent lack of stability. Production losses are high when such materials polymerize or precipitate from solution and become unfit for application to the glass fibers.

In accordance with the present invention, it has been discovered that glass fibers treated with an aqueous solution of the reaction product of vinyl trichlorosilane and an anhydrous, monocarboxylic acid provide improved wet flexural strength characteristics to resins reinforced with such glass fibers. Use of glass fibers treated with these reaction products also enables the production of clear glass fiber reinforced resins. The reaction products are easily prepared and applied, alone or in combination with a size, as an aqueous solution to the glass fibers. These reaction products require no special handling and they remain stable for long periods of time. The reaction products, when applied to glass fibers, become "affixed" to the glass fibers at relatively low temperatures.

Of particular interest in the practice of the invention is the use of the reaction product of vinyl trichlorosilane and glacial acetic acid as a finishing treatment. Other similar reaction products are considered within the scope of the invention. These reaction products may be produced by reacting stoichiometric amounts of vinyl trichlorosilane (1 mole) with anhydrous, lower aliphatic, monocarboxylic acids (3 moles) containing up to 5 carbon atoms such as formic, acetic, acrylic, propionic, and butyric acids. The acids employed are water soluble acids but they should be employed in substantially anhydrous form in order to prevent harmful side reactions. All of these reaction products are water soluble and provide excellent surfaces for glass fibers which are to be used as reinforcements in resins.

The invention is described with respect to the treatment of glass fibers by a reaction product rather than a specific product because it has been impossible to identify the materials obtained when stoichiometric amounts of vinyl trichlorosilane are reacted with the enumerated acids. For example, when vinyl trichlorosilane was reacted with acetic acid, it was expected that vinyl triacetoxysilane would be produced. Vinyl triacetoxysilane distills at 126–128° C. at 25 millimeters' pressure, whereas the reaction product of vinyl trichlorosilane and acetic acid cannot be distilled. Such reaction product instead begins to polymerize to form a solid when attempts are made to distill it at 4 to 5 millimeters' pressure.

The finish materials of the present invention are produced by reacting 1 mole of vinyl trichlorosilane with a stoichiometric amount (3 moles) of the anhydrous acid. The reactants are mixed at room temperature and heated gradually to 100° C. to eliminate HCl which is evolved during the heating. The temperature of the reaction is held at 100° C. with refluxing for from 8 to 24 hours. The reaction product, as thus prepared, remains clear and stable indefinitely. When used as an aqueous solution, the reaction product usually forms about ¼ to 1 percent by weight of the solution.

The use of the finish materials of the present invention is described first with respect to their application as an aqueous solution to glass fibers, such as their application to heat cleaned glass fiber cloth. The glass cloth employed is heated to a temperature of about 1100 to 1400° F. for ten minutes to remove the size therefrom. Thereafter, the cloth is dipped into the aqueous solution containing one percent by weight of the material for a sufficient number of times to insure that complete wetting of the cloth is obtained. The treated cloth is then heated to a temperature of 300° F. for 60 minutes to affix the finish on the glass surface.

A glass fiber-reinforced resin was then produced by pouring an unsaturated polyester resin such as a styrenated polyester resin (Selectron sold by Pittsburgh Plate Glass Company), into 7 superposed layers of the treated cloth. Sufficient resin was poured onto the layers of cloth to thoroughly impregnate the cloth and to constitute the resin content at approximately 60 percent by weight of the laminate. Thereafter, the laminate was heated to a temperature of 250° F. under a pressure of 100 pounds per square inch for 4 minutes in a press.

The cured laminate was tested on a Riehle testing machine to obtain both its wet and dry flexural strengths. The dry flexural strength was obtained first. Thereafter, the laminate was subjected to immersion in boiling water for 3 hours and the wet flexural strength was obtained.

Layers of the glass fiber cloth were also treated in the same manner with the following commercial treating agents. (2) A commercially available "chrome" finish known as "Volan" (methacrylate chromic chloride). (3) An aqueous solution of vinyl triethoxy silane prepared so as to have its pH adjusted to approximately 3. Laminates were formed of glass fiber cloth treated with each of the above finishes and with the same styrenated polyester as employed to produce the laminate reinforced by the glass fibers treated with the finish material of the present invention. Tests were made of the dry and wet flexural strengths of these materials. The results of these tests are set forth in the table below:

TABLE I

| Finish Material | Flexural Strength—Pounds Per Square Inch | |
|---|---|---|
| | Dry | Wet |
| (1) Reaction product of vinyl trichloro silane and acetic acid | 28,000 | 23,000 |
| (2) Methacrylate chromic chloride (Volan) | 35,000 | 15,000 |
| (3) Vinyl triethoxy silane (pH₃) | 22,695 | 18,335 |

The invention may also be described with respect to the use of the reaction product of vinyl trichlorosilane and organic acid in combination with a standard glass fiber size. Such material is applied to glass fiber strands during their formation. A standard size formulation embodying the present invention is as follows:

*Example I*

| | Pounds |
|---|---|
| Polyvinyl acetate latex (55% by weight solids) | 150 |
| Reaction product of vinyltrichlorosilane and acetic acid | 20 |
| AHCO–185A (fatty amide with acetic acid) | 5 |
| Sufficient water to make 250 gallons of size formulation | 1920 |

The sizing solution is applied to the individual fibers just after their emergence from the bushing and prior to or at the same time they are grouped together to form a strand. A roller applicator is usually employed to apply the size to the individual filaments prior to their being grouped into a strand. The size may also be applied to the surface of a felt pad which is conveniently used to collect the individual glass filaments into a strand. The size is transferred from the pad to the filaments as they pass over the pad. Other methods of applying a size to a strand of fibers may be employed if desired.

The glass fiber size can be made by dissolving the finish material of the present invention in water and adding in succession the binder (polyvinyl acetate latex) and a wetting agent (AHCO–185A). Sufficient water is added to the final mixture to obtain the viscosity and strength of solution desired. The above example is illustrative of a glass fiber size employing the novel finish material. This size has been found to be especially useful with glass fiber strands which are to be used in the form of mats of chopped strands as a reinforcement for polyester resins, particularly unsaturated polyester-styrene resins.

The use of the novel finishing agent in combination with latices other than polyvinyl acetate has been found to improve the resin reinforcing properties of glass fibers. These binders or sizes are latices, i.e., aqueous dispersions of synthetic resins made by emulsion polymerization of ethylenic monomers such as the various acrylates including methyl methacrylate and methacrylate and various copolymers thereof, vinyl chloride, styrene, acrylonitrile, chlorovinyl acetate, butadiene, vinylidene chloride, and like materials commonly employed in latex form as binders for glass fibers.

When employed in a size such as described above, the amount of the finish material, such as the reaction product of vinyl trichlorosilane and acetic acid, usually constitutes from ½ to 2 percent by weight of the sizing solution. More than 2 percent by weight of the finish material can be used, but larger amounts do not materially increase the strength characteristics of the glass fiber-resin laminates.

The amount of binder and consequently the amount of size to be employed to achieve binding of the individual filaments to each other throughout their entire length or substantially their entire length depends upon the particular binder employed in the size. When polyvinyl acetate is employed in the size as its binding constituent, it has been found that a minimum of about 0.005 pound of polyvinyl acetate per pound of 140 strand is required. A 140 strand is made up of 204 individual filaments gathered into a strand 14,000 yards in length and weighing one pound. The amount of the binder will vary also, depending upon the type of strand being sized as well as the size employed.

Various amounts of the finish material and binder may be present in the sizing solution depending upon the polarity of the binder being employed. In all events, the amount of the finishing material and binder employed should not exceed that amount which will cause the viscosity of the solution to be greater than about 100 centipoises at 20° C. Sizes having viscosities greater than 100 centipoises at 20° C. are very difficult to apply to glass fiber strands due to the very high speeds of travel of the fibers during attenuation and formation.

A cationic-active substance such as a cationic wetting agent is generally employed in the size. Such substances include cetyl or stearyl monoamine hydrochloride or acetate, dodecyl amine, hexadecyl amine and secondary and tertiary derivatives of the same, for example, dodecyl methyl amine and salts thereof. Alkyl imidazoline derivatives are also satisfactory. Quaternary ammonium compounds such as trimethyl stearyl or cetyl ammonium bromides and chlorides and generally any of the amine compounds that dissociate in water systems to provide a positive radical containing a group of more than 8 and preferably 12 or more carbon atoms may be used. The amount of such wetting agent employed generally ranges from about 0.2 to 1 percent by weight of the sizing solution.

Listed below are further examples of sizing solutions contemplated by the present invention:

*Example II*

| | Parts by weight |
|---|---|
| Polyvinyl acetate | 3.5 to 7.8 |
| Reaction product of vinyl trichlorosilane and acetic acid | 0.5 to 1.0 |
| Water | 100 |

*Example III*

| | |
|---|---|
| Polymethyl methacrylate | 7.8 |
| Reaction product of vinyl trichlorosilane and acetic acid | 1.0 |
| Water | 100 |

*Example IV*

| | |
|---|---|
| Polyvinyl acetate | 7.8 |
| Reaction product of vinyl trichlorosilane and propionic acid | 1.0 |
| Wetting agent | 0.3 |
| Water | 100 |

The use of a size containing the finish material agent of the present invention is now described. Glass filaments were coated during attenuation and forming with the size set forth in Example I, prior to being gathered into a strand. The treated strands were heated at a temperature of 240° F. for 8 hours and then chopped into short lengths, i.e., 2 to 5 inches. The chopped strands were formed into a mat by conventional preform techniques.

Similar preforms were made up of glass fibers sized with a solution containing 41 parts by weight of methacrylate chromic chloride complex in place of the reaction product of Example I. This size also contained 22 parts by weight of polyethylene glycol having a molecular weight of about 1500.

Each of the preforms was then laminated with a commercially available, unsaturated-polyester resin (Selectron). These laminates were tested for wet and dry flexural strength in the manner set forth above. Results of these tests are shown in Table II below:

TABLE II

| Size | Percent by Weight of Resin | Flexural Strength—Pounds per Square Inch | |
|---|---|---|---|
| | | Dry | Wet |
| Reaction product of vinyl trichlorosilane with acetic acid | 55.7 | 48,200 | 36,100 |
| Methacrylate chromic chloride complex (Volan) | 55.8 | 30,100 | 15,200 |

The invention is particularly useful when the glass fibers are to be used as reinforcement for low pressure thermosetting type resins, for example, unsaturated polyester-ethylenic monomer resins such as shown in U.S. Patent No. 2,676,947 granted to Parker. These resins are interpolymers of (A) a polyester of a dihydric alcohol such as ethylene glycol, propylene glycol, 1,3 butylene glycol, diethylene glycol, dipropylene glycol and higher polymers of alkylene glycols, and an alpha, beta ethylenic dicarboxylic acid such as maleic or fumaric acid with other dicarboxylic acids such as adipic, succinic, azelaic and phthalic acids added and (B) a monomer, soluble in the polyester, containing a terminal ethylenic group, $CH_2=C<$, such as styrene, vinyl acetate, vinyl toluene, allyl esters including allyl acetate, allyl succinate, diallyl phthalate, diallyl cyanurate, triallyl cyanurate, dichloro styrene, etc. The invention is also useful when the glass fibers are to be laminated with other resinous or plastic materials such as polyethers or epoxy resins which are condensation polymers of an epihalohydrin and polyhydroxy phenolic compound or derivatives thereof such as bis-phenol A.

It can be seen from the figures in Tables I and II above, that the use of the reaction product of vinyl trichlorosilane and an anhydrous, monocarboxylic, organic acid such as glacial acetic acid as a finish material, as taught by the present invention, provides glass fiber-resin laminates of improved flexural strength. These glass fiber-resin laminates are also clear and free from undesirable coloration or opacity. The finish material may be used as an aqueous solution alone or in combination with a conventional glass fiber size to achieve these improved results. The use of the finish material of the subject invention is especially desired to avoid the high temperatures required to fix presently known finish material on the surface of the glass. The finish material and size containing the finish material may be applied to glass fibers in any of their numerous shapes and forms. It may be applied without taking any special precaution as to the pH of the aqueous solution to render it stable for coating purposes.

Although the present invention has been described with respect to specific details of certain embodiments thereof, it is not intended that such details act as limitations upon the scope of the invention except insofar as set forth in the accompanying claims.

I claim:

1. In the method of making a glass fiber-reinforced, resinous laminate comprising treating glass fibers with a material which acts as a coupling agent to provide a better bond between the glass fibers and the resin and thereby increase the tensile strength of the resinous laminate, combining the treated fibers with a resin in polymerizable form and polymerizing the resin and treated glass fiber combination, the improvement which comprises treating the glass fibers with an aqueous solution containing ¼ to 1 percent by weight of a non-tacky, liquid coupling agent formed by the reaction of one mole of a vinyl trihalosilane and three moles of an anhydrous, lower aliphatic, monocarboxylic acid and drying the treated fibers prior to combining them with the resin.

2. In the method of making a glass fiber-reinforced, resinous laminate comprising treating glass fibers with a material which acts as a coupling agent to provide a better bond between the glass fibers and the resin and thereby increase the tensile strength of the resinous laminate, combining the treated fibers with a resin in polymerizable form and polymerizing the resin and treated glass fiber combination, the improvement which comprises treating the glass fibers with a dilute, aqueous size containing a textile lubricant, a synthetic latex binder made by emulsion polymerization of an ethylenic monomer and one-half to two percent by weight of a non-tacky, liquid coupling agent formed by the reaction of one mole of a vinyl trihalosilane and three moles of an anhydrous, lower aliphatic, monocarboxylic acid and drying the treated fibers prior to combining them with the resin.

3. The improvement in the method as described in claim 1 wherein the silane is vinyl trichlorosilane and the acid is glacial acetic acid.

4. The improvement in the method as described in claim 2 wherein the silane is vinyl trichlorosilane and the acid is glacial acetic acid.

References Cited in the file of this patent

UNITED STATES PATENTS

| 2,390,370 | Hyde | Dec. 4, 1945 |
| 2,530,635 | Sowa | Nov. 21, 1950 |
| 2,537,073 | MacKenzie | Jan. 9, 1951 |
| 2,700,010 | Balz | Jan. 18, 1955 |
| 2,801,189 | Collier | July 30, 1957 |